(12) United States Patent
Tachibana et al.

(10) Patent No.: US 9,741,250 B2
(45) Date of Patent: Aug. 22, 2017

(54) PARKING ASSIST APPARATUS, PARKING ASSIST METHOD, AND COMPUTER PROGRAM PRODUCT

(71) Applicant: AISIN SEIKI KABUSHIKI KAISHA, Kariya-shi, Aichi (JP)

(72) Inventors: Hiroyuki Tachibana, Okazaki (JP); Yu Tanaka, Nagoya (JP); Tsuyoshi Kuboyama, Toyota (JP); Tomohisa Yamashita, Toyohashi (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 14/431,608

(22) PCT Filed: Sep. 27, 2013

(86) PCT No.: PCT/JP2013/076432
§ 371 (c)(1),
(2) Date: Mar. 26, 2015

(87) PCT Pub. No.: WO2014/051125
PCT Pub. Date: Apr. 3, 2014

(65) Prior Publication Data
US 2015/0254981 A1 Sep. 10, 2015

(30) Foreign Application Priority Data
Sep. 28, 2012 (JP) .................................. 2012-217915

(51) Int. Cl.
*G08G 1/00* (2006.01)
*G08G 1/14* (2006.01)
(Continued)

(52) U.S. Cl.
CPC ............... *G08G 1/14* (2013.01); *B60Q 9/008* (2013.01); *B60R 1/00* (2013.01); *G06K 9/00798* (2013.01);
(Continued)

(58) Field of Classification Search
CPC ........................................................ G08G 1/14
(Continued)

(56) References Cited

U.S. PATENT DOCUMENTS 8,779,939 B2 7/2014 Barth et al.
8,912,923 B2 12/2014 Barth et al.
(Continued)

FOREIGN PATENT DOCUMENTS

CN 101402362 A 4/2009
CN 101616833 A 12/2009
(Continued)

OTHER PUBLICATIONS

Communication dated Nov. 24, 2015 from the Japanese Patent Office in counterpart application No. 2012-217915.
(Continued)

*Primary Examiner* — Santiago Garcia
(74) *Attorney, Agent, or Firm* — Sughrue Mion, PLLC

(57) ABSTRACT

A parking assist apparatus of an embodiment includes an area detection unit, a line detection unit, and a target position calculation unit. The area detection unit detects a parking allowable area where the parking of a vehicle is allowable. The line detection unit detects a parking section line provided on a track surface. The target position calculation unit calculates a target parking position by using a detection result of the parking allowable area by the area detection unit when the parking allowable area is detected by the area
(Continued)

detection unit, the parking section line is detected by the line detection unit, and the parking section line is located outside the parking allowable area.

7 Claims, 6 Drawing Sheets

(51) Int. Cl.
  *B60R 1/00* (2006.01)
  *G06K 9/00* (2006.01)
  *B60Q 9/00* (2006.01)
(52) U.S. Cl.
  CPC .... *G06K 9/00812* (2013.01); *B60R 2300/302* (2013.01); *B60R 2300/305* (2013.01); *B60R 2300/806* (2013.01); *B60R 2300/8026* (2013.01); *G06T 2207/30264* (2013.01)
(58) Field of Classification Search
  USPC ..................................................... 340/932.2
  See application file for complete search history.

(56) References Cited

U.S. PATENT DOCUMENTS

| | | | |
|---|---|---|---|
| 2004/0257244 A1 | 12/2004 | Kubota et al. | |
| 2005/0057374 A1* | 3/2005 | Tanaka | G08G 1/14 340/932.2 |
| 2009/0091475 A1* | 4/2009 | Watanabe | B60Q 9/005 340/932.2 |
| 2009/0174574 A1 | 7/2009 | Endo et al. | |
| 2009/0248577 A1* | 10/2009 | Hoj | G07B 15/063 705/40 |
| 2009/0278709 A1* | 11/2009 | Endo | B62D 15/027 340/932.2 |
| 2010/0019935 A1 | 1/2010 | Kawabata et al. | |
| 2010/0191433 A1* | 7/2010 | Groult | G01S 13/87 701/70 |
| 2011/0057782 A1* | 3/2011 | Chundrlik, Jr. | B60R 1/00 340/436 |
| 2012/0101660 A1* | 4/2012 | Hattori | G05D 1/0022 701/2 |
| 2013/0021171 A1* | 1/2013 | Hsu | G06K 9/00812 340/932.2 |
| 2013/0093887 A1* | 4/2013 | Wu | G06K 9/00805 348/148 |
| 2014/0055615 A1* | 2/2014 | Chen | B62D 15/028 348/148 |

FOREIGN PATENT DOCUMENTS

| | | |
|---|---|---|
| EP | 1642808 A1 | 4/2006 |
| EP | 2017138 A1 | 1/2009 |
| JP | 2006-193011 A | 7/2006 |
| JP | 2008-296639 A | 12/2008 |
| JP | 4235026 A | 3/2009 |
| JP | 2009-143410 A | 7/2009 |
| JP | 2009-202610 A | 9/2009 |
| JP | 4432930 A | 3/2010 |
| JP | 2011522737 A | 8/2011 |
| JP | 2011524298 A | 9/2011 |

OTHER PUBLICATIONS

Communication dated Jan. 4, 2016 from the European Patent Office in counterpart application No. 13842680.4.
International Search Report for PCT/JP2013/076432 dated Dec. 24, 2013 [PCT/ISA/210].
Written Opinion for PCT/JP2013/076432 dated Dec. 24, 2013 [PCT/ISA/237].
Communication dated Mar. 2, 2016 from the State Intellectual Property Office of the P.R.C. issued in corresponding Application No. 201380050334.3.

* cited by examiner

PARKING ASSIST APPARATUS, PARKING ASSIST METHOD, AND COMPUTER PROGRAM PRODUCT

CROSS REFERENCE TO RELATED APPLICATIONS

This application is national stage application of International Application No. PCT/JP2013/076432, filed Sep. 27, 2013, which designates the United States, incorporated herein by reference, and which is based upon and claims the benefit of priority from Japanese Patent Application No. 2012-217915, filed Sep. 28, 2012, the entire contents of which are incorporated herein by reference.

FIELD

Embodiments of the present invention relate to a parking assist apparatus, a parking assist method, and a computer program.

BACKGROUND

Conventionally, there has been known, as methods for calculating a target parking position of a vehicle in a parking assist apparatus, a method in which a detection result is used as a result from detecting parking section lines using a camera (a parking section line recognition method), and a method in which a detection result is used as a result of detecting a space that allows parking using an ultrasonic sonar (a parking allowable space recognition method) (e.g., refer to Patent Documents 1 and 2).

CITATION LIST

Patent Literature

Patent Document 1: Japanese Patent No. 4235026
Patent Document 2: Japanese Patent No. 4432930

SUMMARY

Technical Problem

However, when the detection result of the parking section lines is used for calculating the target parking position, the target parking position cannot be set unless the parking section lines are provided on a track surface. Furthermore, even if another vehicle is parked on one of a pair of parking section lines, the target parking position is set to the intermediate position of the pair of parking section lines, thereby causing the target parking position to be set excessively close to the other vehicle.

When the detection result of the parking allowable space is used for calculating the target parking position, the target parking position cannot be set unless another vehicle (obstacle) is present. Furthermore, when the other vehicle is parked on an angle with respect to the parking section lines, the target parking position is caused to be set on an angle with respect to the parking section lines in accordance with the angle.

In Patent Document 2, the target parking position is set using the method in which the detection result of the parking section lines is used or the method in which the detection result of the parking allowable space is used. When both the parking allowable space and the parking section lines are detected, the parking allowable space is set to the intermediate position of the pair of parking section lines, thereby causing the target parking position to be set excessively close to another vehicle.

For such a parking assist apparatus, as one example, it is desired to prevent the target parking position from being set excessively close to another vehicle when both the parking allowable space and the parking section lines are detected.

Solution to Problem

A parking assist apparatus according to an embodiment comprises an area detection unit, a line detection unit, and a target position calculation unit. The area detection unit detects a parking allowable area where parking of a vehicle is allowable. The line detection unit that detects a parking section line provided on a track surface. The target position calculation unit calculates a target parking position by using a detection result of the parking allowable area by the area detection unit when the parking allowable area is detected by the area detection unit, the parking section line is detected by the line detection unit, and the parking section line is located outside the parking allowable area.

As one example, the parking assist apparatus uses the detection result of the parking allowable area when both a parking allowable space and the parking section line are detected, thereby making it possible to prevent the target parking position from being set excessively close to another vehicle.

In the parking assist apparatus, the area detection unit detects the parking allowable area by using a detection result output from an emission unit that is provided on the vehicle, emits waves in a side direction of the vehicle, and detects reflected waves of the waves, the line detection unit detects the parking section line by using data that is taken by an imaging unit in backward traveling of the vehicle and output from the imaging unit, the imaging unit being provided on the vehicle and imaging an area behind the vehicle, and the target position calculation unit repeats calculation of the target parking position in the backward traveling of the vehicle.

As one example, the parking assist apparatus can sequentially detect the conditions behind the vehicle as the vehicle travels backward, thereby making it possible to sequentially change the target parking position in accordance with the detection result.

In the parking assist apparatus, when the parking section line is located outside the parking allowable area, the target position calculation unit calculates the target parking position by using a detection result of the parking section line by the line detection unit in addition to the detection result of the parking allowable area by the area detection unit.

As one example, the parking assist apparatus can prevent the target parking position from being set excessively close to another vehicle by using the detection result of the parking section line in addition to the detection result of the parking allowable area.

In the parking assist apparatus, the line detection unit detects a pair of parking section lines provided on a track surface, and when one of the pair of parking section lines is located in the parking allowable area, and the other one of the pair of parking section lines is located outside the parking allowable area, the target position calculation unit sets the target parking position closer to the one of the pair of parking section lines between the pair of parking section lines.

As one example, the parking assist apparatus can prevent the target parking position from being set excessively close to another vehicle while the target parking position is set between the pair of parking section lines.

In the parking assist apparatus, when the parking allowable area is detected by the area detection unit and at least one of a pair of parking section lines provided on a track surface is detected by the line detection unit, the target position calculation unit sets the target parking position along the parking section line detected by the line detection unit.

As one example, the parking assist apparatus can prevent the target parking position from being set on an angle with respect to the parking section lines even when the other one of the pair of parking section lines is not detected.

A parking assist method according to an embodiment comprises detecting a parking allowable area where parking of a vehicle is allowable by an area detection unit, detecting a parking section line provided on a track surface by a line detection unit, and calculating a target parking position by using a detection result of the parking allowable area by the area detection unit by a target position calculation unit when the parking allowable area is detected by the area detection unit, the parking section line is detected by the line detection unit, and the parking section line is located outside the parking allowable area.

As one example, the parking assist method uses the detection result of the parking allowable area when both a parking allowable space and the parking section line are detected, thereby making it possible to prevent the target parking position from being set excessively close to another vehicle.

A computer program according to an embodiment causes a computer to execute detecting a parking allowable area where parking of a vehicle is allowable, detecting a parking section line provided on a track surface, and calculating a target parking position by using a detection result of the parking allowable area when the parking allowable area is detected, the parking section line is detected, and the parking section line is located outside the parking allowable area.

As one example, the program uses the detection result of the parking allowable area when both a parking allowable space and the parking section line are detected, thereby making it possible to prevent the target parking position from being set excessively close to another vehicle.

DESCRIPTION OF EMBODIMENTS

In this embodiment, a vehicle 1 may be an automobile (an internal combustion automobile) using an internal combustion engine (an engine, which is not illustrated) as a driving source, an automobile (an electric automobile, a fuel-cell-powered automobile, or the like) using an electric motor (a motor, which is not illustrated) as the driving source, or an automobile (a hybrid automobile) using both the internal combustion engine and the electric motor as the driving source, for example. The vehicle 1 can be provided with various transmissions and various apparatuses (systems, parts, and the like) necessary to drive the internal combustion engine or the electric motor. The types, the number, the layout, and the like of apparatuses relating to the driving of wheels 3 of the vehicle 1 can be set in various manners.

Figure 1:
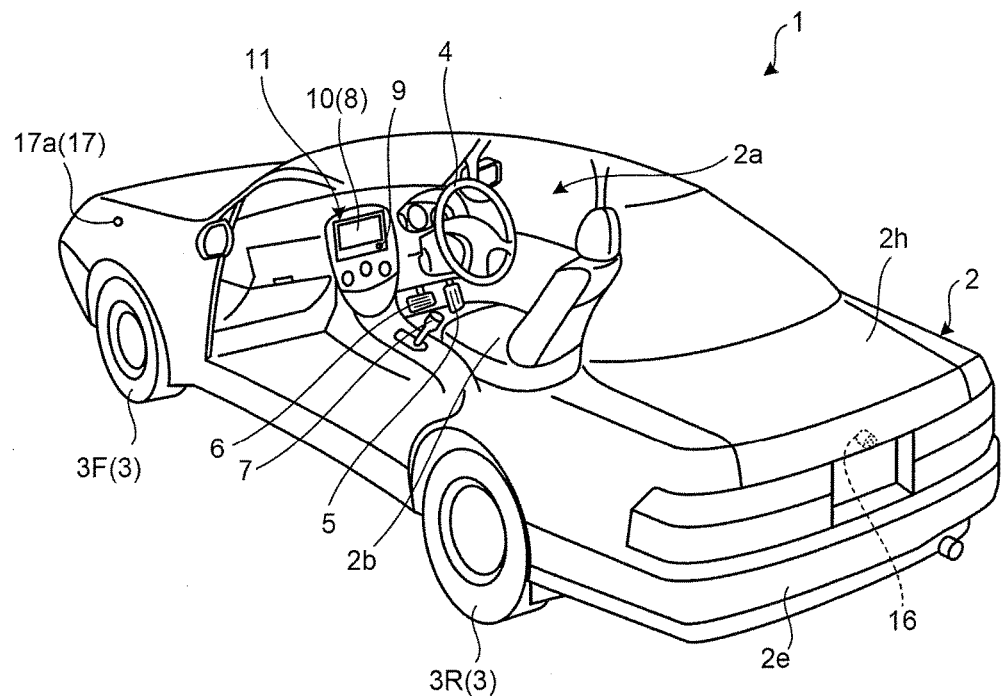
FIG. 1 is a partially cutout perspective view illustrating one example of a vehicle according to an embodiment.

As illustrated in FIG. 1, a vehicle body 2 forms a vehicle interior 2a in which an occupant (not illustrated) is seated. In the vehicle interior 2a, a steering unit 4, an acceleration operation unit 5, a brake operation unit 6, a gear shift operation unit 7, and the like are provided in such a manner that they face a seat 2b for a driver who is the occupant. In the embodiment, as one example, the steering unit 4 is a steering wheel projected from a dashboard (an instrument panel), the acceleration operation unit 5 is an accelerator pedal located under the foot of the driver, the brake operation unit 6 is a brake pedal located under the foot of the driver, and the gear shift operation unit 7 is a gearshift lever projected from a center console. They are, however, not limited to these examples.

In the vehicle interior 2a, a display device 8 (a display output unit) and a voice output device 9 (a voice output unit) are provided. Examples of the display device 8 include a liquid crystal display (LCD) and an organic electroluminescent display (GELD). The voice output device 9, as one example, is a speaker. In the embodiment, as one example, the display device 8 is covered with a transparent operation input unit 10 (e.g., a touch panel). The occupants and the like can view videos (images) displayed on a display screen of the display device 8 through the operation input unit 10. The occupants and the like can perform operation input (instruction input) by touching, pressing, or sweeping the operation input unit 10 with their fingers or other means at a position corresponding to the video (image) displayed on the display screen of the display device 8. In the embodiment, as one example, the display device 8, the voice output device 9, the operation input unit 10, and the like are provided on a monitoring device 11 that is located at the central portion of the dashboard in a vehicle width direction (right-left direction). The monitoring device 11 can include an operation input unit (not illustrated) such as a switch, a dial, a joystick, or a push-button. Another voice output device (not illustrated) can be provided at a different location from that of the monitoring device 11 in the vehicle interior 2a. The another voice output device and the voice output device 9 of the monitoring device 11 can output voices. In the embodiment, as one example, the monitoring device 11 is also used for a navigation system and an audio system. The monitoring device for a parking assist apparatus may be provided separately from those systems. In addition, a warning sound and the like can be output from a voice output unit such as a buzzer 24 (refer to FIG. 3) besides the voice output device 9.

Figure 2:
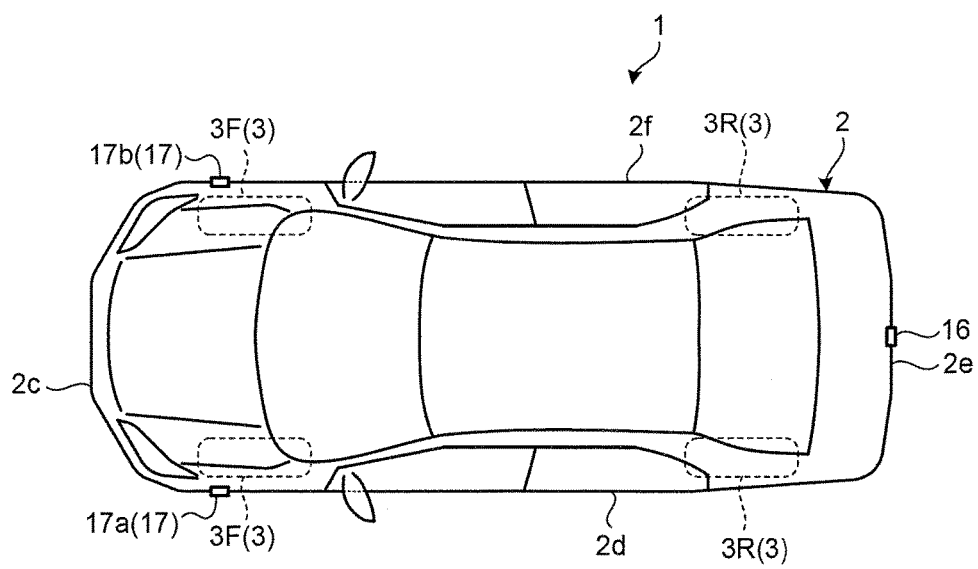
FIG. 2 is a plan view illustrating one example of the vehicle according to the embodiment.
Figure 3:
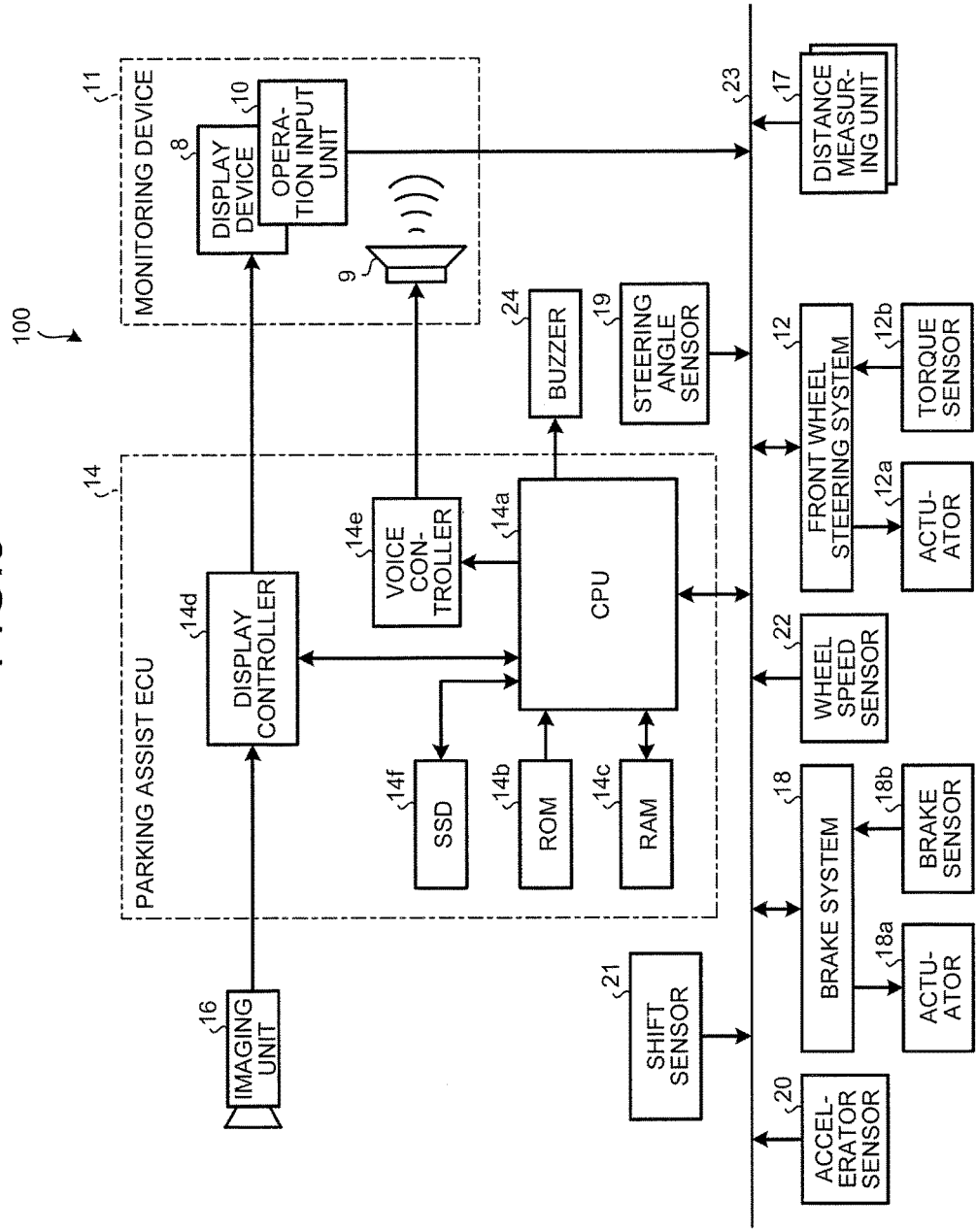
FIG. 3 is a block diagram illustrating one exemplary configuration of the vehicle according to the embodiment.

As illustrated in FIGS. 1 and 2, the vehicle 1 is a four-wheel vehicle (a four-wheeled automobile) and has two front wheels 3F at right and left thereof and two rear wheels 3R at right and left thereof, as one example, in the embodiment. In the embodiment, the two front wheels 3F at right and left are configured to be capable of being steered (be capable of being turned) out of the four wheels 3. Specifically, as illustrated in FIG. 3, the vehicle 1 has a front wheel steering system 12 that steers the front wheels 3F. The front wheel steering system 12 is electrically controlled by a parking assist electronic control unit (ECU) 14 and the like to operate an actuator 12a thereof. The front wheel steering system 12 is an electrically assisted power steering system or a steer-by-wire (SBW) system, for example. The front wheel steering system 12 supplements a steering force by applying torque (assist torque) to the steering unit 4 from the actuator 12a or steers (automatically steers) the front wheels 3F. In the embodiment, as one example, the two front wheels 3F are turned in a homeomorphic manner and substantially in parallel with each other. The rear wheels 3R may also be steered besides the front wheels 3F. The rear wheels 3R may be the only wheels that are steered. Any of the wheels can be set to the driving wheel(s).

In the embodiment, as illustrated in FIG. 2, the vehicle 1 (vehicle body 2) is provided with an imaging unit 16, as one example. The imaging unit 16 is a digital camera that includes an imaging element such as a charge coupled device (CCD) or a CMOS image sensor (CIS), for example. The imaging unit 16 is a monocular camera, as one example. The imaging unit 16 can output image data (moving image data, or frame data) at a certain frame rate. The imaging unit 16 has a wide-angle lens and can image an area ranging from 140° to 190° (as an angle of view) in the horizontal direction, as one example. An optical axis of the imaging unit 16 is set downward (obliquely downward). The imaging unit 16, thus, can image surroundings, which include a road surface, of the vehicle body 2 (vehicle 1). In the embodiment, as one example, the imaging unit 16 is disposed on an end portion 2e on the rear side (rear side in the vehicle's front-rear direction) of the vehicle body 2 and provided on a wall portion under a door 2h of a rear trunk. The data taken by the imaging unit 16 can be stored in a read only memory (RAM) 14c of the parking assist ECU 14, as one example. The parking assist ECU 14 performs arithmetic processing and image processing on the basis of the image data obtained by the imaging unit 16. The parking assist ECU 14 can detect (extract), from the image obtained by the imaging unit 16, an object (obstacle) that is present in the surrounding of the vehicle 1 and that has the potential of interfering with the vehicle 1 that is moving.

In the embodiment, as illustrated in FIGS. 1 and 2, the vehicle 1 (vehicle body 2) is provided with a plurality of (two in the embodiment as one example) distance measuring units 17 (distance measuring units 17a and 17b, emission units, or search units), as one example. In the embodiment, as one example, the distance measuring unit 17a is disposed at an end portion 2d on the left side of the vehicle body 2 (the left side in the vehicle width direction). The distance measuring unit 17b is disposed at an end portion 2f on the right side of the vehicle body 2 (the right side in the vehicle width direction). The distance measuring units 17a and 17b are disposed near an end portion 2c (an end portion in plan view) on the front side of the vehicle body 2 (the front side in the vehicle front-rear direction). The distance measuring units 17a and 17b are provided on the front portion of the vehicle body 2. The distance measuring units 17a and 17b are disposed above the front wheels 3F, as one example. The distance measuring units 17 are sonars (sonar sensors, ultrasonic detectors, or active type distance sensors) that emit (radiate) ultrasonic waves as waves and capture (detect) the reflected waves, for example. The parking assist ECU 14 can measure the presence or absence of and the distance from an object (obstacle) located in the side direction of the vehicle 1 (vehicle body 2) from the detection results by the distance measuring units 17. The distance measuring units 17 is one example of an object detection unit.

In the embodiment, as illustrated in FIG. 3, in a parking assist system 100, the parking assist ECU 14, the monitoring device 11, the front wheel steering system 12, the distance measuring units 17, a brake system 18, a steering angle sensor 19 (an angle sensor), an accelerator sensor 20, a shift sensor 21, a wheel speed sensor 22, and the like are electrically connected to one another through an in-vehicle network 23 (an electrical communication line), as one example. The in-vehicle network 23 is configured as a controller area network (CAN), as one example. The parking assist ECU 14 can control the front wheel steering system 12, the brake system 18, and the like by sending control signals through the in-vehicle network 23. The parking assist ECU 14 can also receive the detection results of a torque sensor 12b, the distance measuring units 17, a brake sensor 18b, the steering angle sensor 19, the accelerator sensor 20, the shift sensor 21, the wheel speed sensor 22, and the like, and instruction signals (control signals, switching signals, operation signals, input signals, or data) from the operation input unit 10 and the like through the in-vehicle network 23.

The parking assist ECU 14 includes a central processing unit (CPU) 14a, a read only memory (ROM) 14b, the RAM 14c, a display controller 14d, a voice controller 14e, a solid state drive (SSD) 14f (a flash memory), as one example. The CPU 14a can perform image processing relating to an image displayed on the display device 8 and various types of arithmetic processing such as arithmetic operation on a moving path of the vehicle 1, and determination of the presence or absence of interference with an object, for example. The CPU 14a can read a computer program stored (installed) in a non-volatile storage unit such as the ROM 14b and perform arithmetic processing in accordance with the program. The RAM 14c temporarily stores therein various types of data used for the arithmetic operation performed by the CPU 14a. The display controller 14d mainly performs the image processing using the image data obtained by the imaging unit 16, the image processing (e.g., image combination) on the image data displayed on the display device 8, and the like out of the arithmetic processing performed by the parking assist ECU 14. The voice controller 14e mainly performs processing on the voice data output from the voice output device 9 out of the arithmetic processing performed by the parking assist ECU 14. The SSD 14f is a rewritable non-volatile storage unit and can store therein data even when the power source of the parking assist ECU 14 is turned off. The CPU 14a, the ROM 14b, the RAM 14c, and the like can be integrated in one package. The parking assist ECU 14 may use another logical operation processor such as a digital signal processor (DSP), a logic circuit, and the like instead of the CPU 14a. Instead of the SSD 14f, a hard disk drive (HDD) may be provided. The SSD 14f and the HDD may be provided separately from the parking assist ECU 14.

The brake system 18 is an anti-lock brake system (ABS) that prevents the brake from being locked, an electronic stability control (ESC) that prevents the vehicle 1 from being skidded in cornering, an electric brake system that increases a braking force (performs a brake assist), or brake-by-wire (BBW), for example. The brake system 18 applies a braking force to the wheels 3 (vehicle 1) from an actuator 18a.

The steering angle sensor 19 is a sensor that detects a steering amount (a rotating angle) of the steering unit 4 (e.g., a steering wheel, in the embodiment) and is configured to use a Hall element, as one example. The parking assist ECU 14 acquires the steering amount of the steering unit 4 operated by the driver, the steering amounts of the respective wheels 3 in automatic steering, and the like from the steering angle sensor 19, and performs various types of control. The torque sensor 12b detects torque applied by the driver to the steering unit 4.

The wheel speed sensor 22 is a sensor that detects rotating amounts or the number of rotations per unit time of the wheels 3, and is configured to use a Hall element, as one example. The parking assist ECU 14 computes a moving amount of the vehicle 1 on the basis of the data acquired from the wheel speed sensor 22, and performs various types of control. The wheel speed sensor 22 is provided on the brake system 18 in some cases. The brake system 18 can detect the locked brake, the wheels 3 spinning free, a sign of skidding, and the like from a difference in rotation between the right and left wheels 3 and the like, and perform various types of control. When the wheel speed sensor 22 is provided on the brake system 18, the parking assist ECU 14 acquires data through the brake system 18. The brake sensor 18b is a sensor that detects an operation amount of the brake pedal. The parking assist ECU 14 acquires information through the brake system 18. For example, when the brake operation unit 6 is operated in automatic steering, the parking assist ECU 14 can interrupt or stop the automatic steering on the basis of the judgment that the current condition is improper for automatic steering.

The shift sensor 21 is a sensor (a switch) that detects the position of a movable section (a lever, an arm, or a button) of the gear shift operation unit 7, as one example, and is configured to use a displacement sensor or the like. For example, when the movable section is set to a reverse position, the parking assist ECU 14 can start assist control, while when the movable section is changed to a forward position from the reverse position, the parking assist ECU 14 can stop the assist control.

The configurations, arrangements, electrical connections, and the like of the various sensors and actuators described above are examples and can be set (changed) in various ways.

Figure 4:
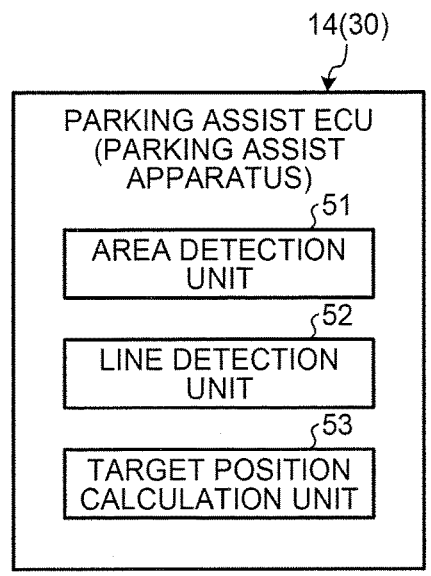
FIG. 4 is a block diagram illustrating one exemplary functional configuration of the vehicle according to the embodiment.

In the embodiment, as one example, the parking assist ECU 14 functions (operates) as at least part of a parking assist apparatus 30 by cooperation of hardware and software (a computer program). In the embodiment, as illustrated in FIG. 4, the parking assist ECU 14 functions (operates) as an area detection unit 51, a line detection unit 52, a target position calculation unit 53, and the like, as one example. As one example, when the movable section of the gear shift operation unit 7 is set to the reverse position, the parking assist ECU 14 functions as the respective units described above and performs parking assist processing (a parking assist method). The program can include modules corresponding to the respective blocks illustrated in FIG. 4, as one example.

The area detection unit 51 detects a parking allowable area 201 (a parking allowable space, refer to FIG. 7) where the parking of the vehicle 1 is allowable. The area detection unit 51 detects the parking allowable area 201 by using the detection results output from the distance measuring units 17 that emit waves in the side direction of the vehicle 1 and detect the reflected waves of the waves.

Figure 5:
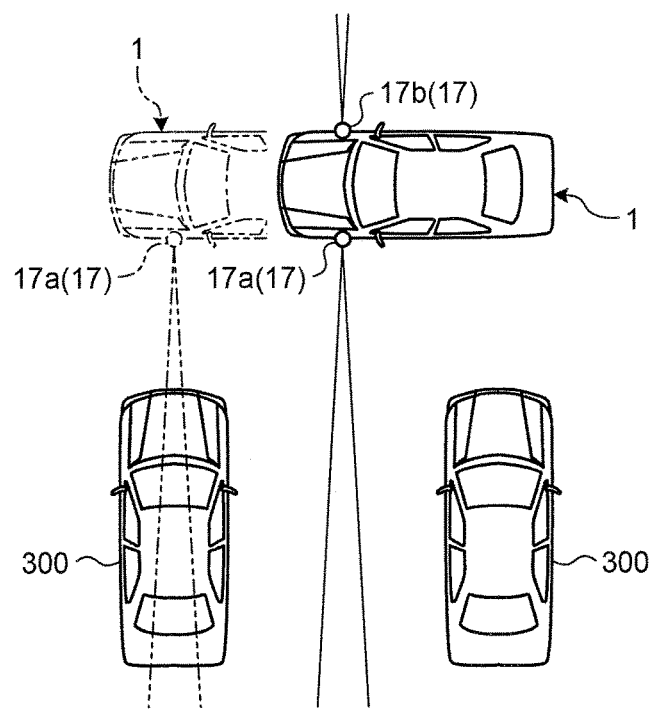
FIG. 5 is an explanatory diagram illustrating one example of a process of detecting a parking allowable area according to the embodiment.
Figure 6:
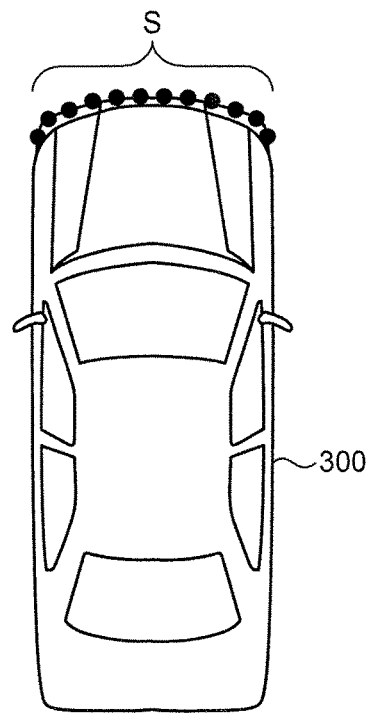
FIG. 6 is an explanatory diagram illustrating one example of a reflection portion of another vehicle according to the embodiment.

The following describes a method of detecting the parking allowable area 201 by using the detection results of the distance measuring units 17 with reference to FIGS. 5 and 6. The distance measuring unit 17 outputs a reflection portion S (e.g., a group of reflected points of sound waves or the like) of an obstacle such as another vehicle 300 as a sequence of points. The output data is stored in the RAM 14b at each output cycle, as one example. The area detection unit 51 detects the parking allowable area 201 located in the side direction of the vehicle 1 on the basis of the detection result (sequence of points) from the distance measuring unit 17. The area detection unit 51 detects, independently and simultaneously on the right and left sides, the parking allowable area 201 located in the vehicle right-left side direction on the basis of the detection results of the distance measuring unit 17a on the left side and the distance measuring unit 17b on the right side. The detection methods on the right and left sides may be the same. The following describes the method of detecting the parking allowable area 201 located in one side direction of the vehicle 1. When detecting the sequence of points having a first specified length and no sequence of points in a length equal to or larger than a second specified length after the sequence of points having the first specified length, the area detection unit 51 determines that the parking allowable area 201 is present on a lateral side (on the front side in the traveling direction of the vehicle 1 in detecting the sequence of points) of the obstacle corresponding to the sequence of points having the first specified length. The second specified length is a minimum width necessary for an area to allow the vehicle 1 to be parked. The second specified length is, thus, set in accordance with the vehicle width of the vehicle 1. The distance measuring units 17 can also detect the outer shape of the obstacle located in the side direction of the vehicle 1 on the basis of the detection results (sequence of points) of the distance measuring units 17. The detection results of the distance measuring units 17 in a time other than a time in parking assist processing may also be stored in the RAM 14b.

Figure 7:
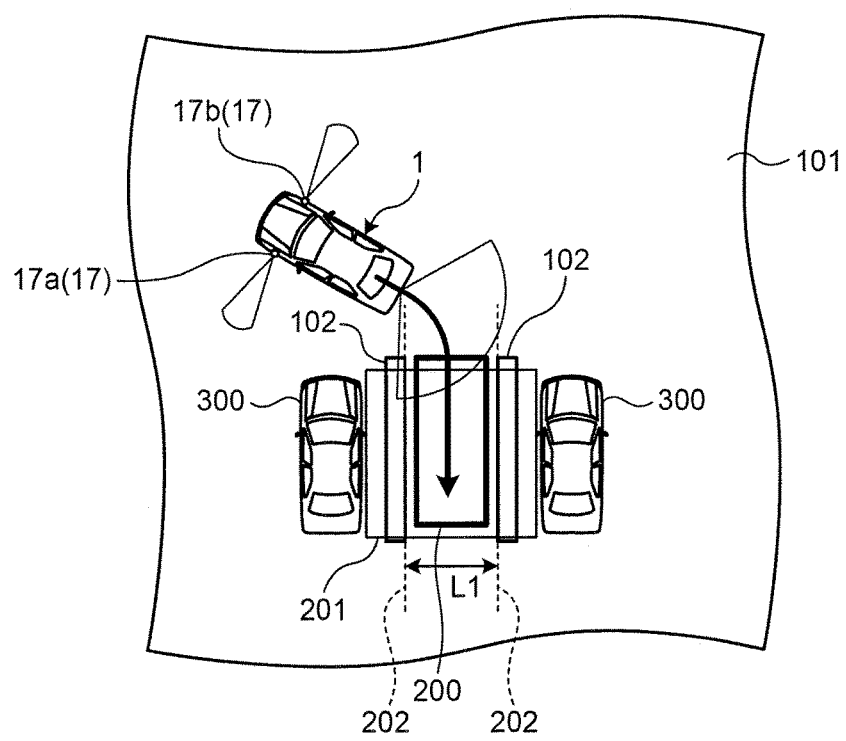
FIG. 7 is a schematic diagram illustrating one example of a target parking position according to the embodiment.

The line detection unit 52 detects parking section lines 102 (white lines, or guiding lines, refer to FIG. 7) provided on a track surface 101 (a ground surface or a road surface, refer to FIG. 7). The line detection unit 52 detects the parking section lines 102 by using the data taken and output from the imaging unit 16 that images an area behind the vehicle 1. The line detection unit 52 can detect the parking section lines 102 by using the data that is taken by the imaging unit 16 in backward traveling, in forward traveling, or at the stop of the vehicle 1 and output from the imaging unit 16. The taken data is stored in the RAM 14b, as one example. The line detection unit 52 detects a pair of parking section lines 102 provided on the track surface 101 by performing edge extraction on the taken data output from the imaging unit 16, as one example. Specifically, the line detection unit 52 extracts the points (feature points) having a luminance change equal to or larger than a specified threshold. The line detection unit 52, then, converts respective pixels from an imaging (camera) coordinate system into an actual coordinate system by distortion correction. The line detection unit 52 performs straight-line approximation processing on the sequence of the feature points and obtains the outline of the feature points. The line detection unit 52 detects a portion including the outline having a length equal to or larger than a specified length as the parking section line 102, as one example. For another example, the line detection unit 52 may detect a pair of (two) outlines in parallel with each other with a distance equal to or larger than a specified distance therebetween as the pair of parking section lines 102. The data taken by the imaging unit 16 at a time other than a time in parking assist processing may also be stored in the RAM 14b.

As illustrated in FIG. 7, when the parking allowable area 201 is detected by the area detection unit 51, the parking section lines 102 are detected by the line detection unit 52, and a pair of parking section lines 102 are located in the parking allowable area 201, the target position calculation unit 53 calculates a target parking position 200 by using the detection result of the parking section lines 102 by the line detection unit 52. The target position calculation unit 53 sets the target parking position 200 such that the center of the target parking position 200 is located at the medium of the pair of parking section lines 102. As one example, when the parking section lines 102 are detected, the target position calculation unit 53 sets the target parking position 200 such that the front edge of the target parking position 200 and the front edges of the parking section lines 102 are on the same line. As one example, when a distance L1 between the pair of parking section lines 102 (distance between broken lines 202) is equal to or larger than a specified parking width, the target position calculation unit 53 may calculate the target parking position 200 while when the distance between the pair of parking section lines 102 (distance between broken lines 202) is not equal to or larger than the specified parking width, the target position calculation unit 53 may not calculate the target parking position 200. The specified parking width is obtained by adding a specified width to the vehicle width of the vehicle 1, as one example.

Figure 8:
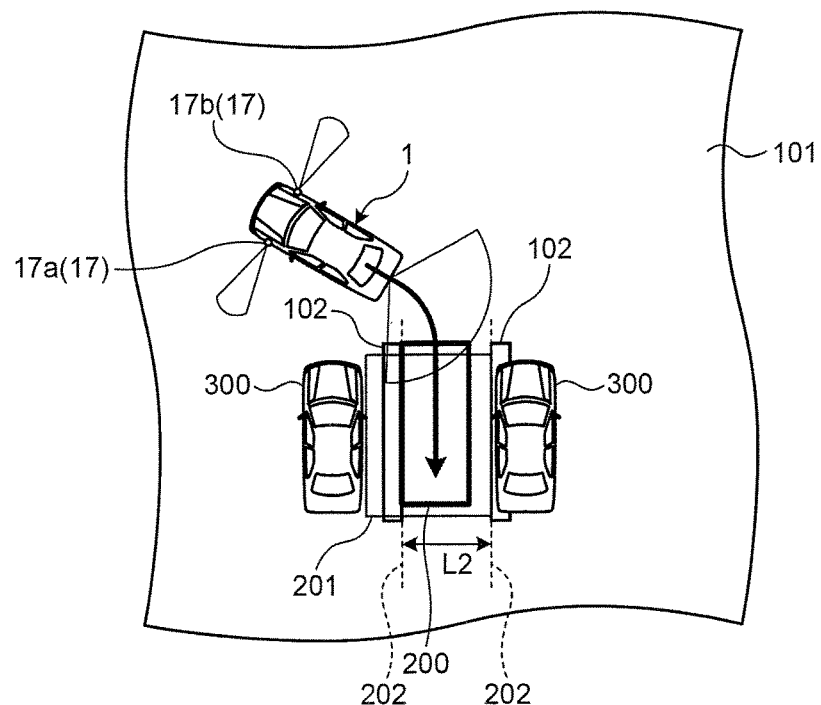
FIG. 8 is a schematic diagram illustrating another example of the target parking position according to the embodiment.

As illustrated in FIG. 8, when the parking allowable area 201 is detected by the area detection unit 51, the parking section lines 102 are detected by the line detection unit 52, and the parking section line 102 is located outside the parking allowable area 201, then the target position calculation unit 53 calculates the target parking position 200 by using the detection result of the parking allowable area 201 by the area detection unit 51. In this case, the target position calculation unit 53 may use only the detection result of the parking allowable area 201 by the area detection unit 51. The target position calculation unit 53 may also use the detection result of the parking section lines 102 by the line detection unit 52 together with the detection result of the parking allowable area 201 by the area detection unit 51. When the parking section line 102 is located outside the parking allowable area 201, the target position calculation unit 53 may calculate the target parking position 200 by using the detection result of the parking allowable area 201 by the area detection unit 51 and the detection result of the parking section lines 102 by the line detection unit 52.

FIG. 8 illustrates one example where one (left) parking section line 102 is located in the parking allowable area 201, the other vehicle 300 is located on the other (right) parking section line 102, and thus the other (right) parking section line 102 is located outside the parking allowable area 201. In the example illustrated in FIG. 8, when a distance L2 (distance between the broken lines 202) between one parking section line 102 (on the left side in FIG. 8) located in the parking allowable area 201 and the other vehicle 300 (the other vehicle 300 or an obstacle on the right side in FIG. 8) located on the other parking section line 102 located outside the parking allowable area 201 is equal to or larger than a specified parking width, as one example, the target position calculation unit 53 sets the target parking position 200 closer to the one parking section line 102. When one of the pair of parking section lines 102 is located in the parking allowable area 201 while the other one of the pair of parking section lines 102 is located outside the parking allowable area 201, the pair of parking section lines 102 being detected by the line detection unit 52, then the target position calculation unit 53 sets the target parking position 200 closer to the one of the pair of parking section lines 102 between the pair of parking section lines 102.

In contrast, when the distance L2 between one parking section line 102 (on the left side in FIG. 8) located in the parking allowable area 201 and the other vehicle 300 (the other vehicle 300 or an obstacle on the right side in FIG. 8) located on the other parking section line 102 located outside the parking allowable area 201 is smaller than the specified parking width, as one example, the target position calculation unit 53 sets the target parking position 200 by using only the detection result of the parking allowable area 201 by the area detection unit 51 out of the detection result of the parking allowable area 201 by the area detection unit 51 and the detection result of the parking section lines 102. Specifically, in this case, the target position calculation unit 53 sets the target parking position 200 (not illustrated) such that the center of the parking allowable area 201 in its width direction coincides with the center of the target parking position 200 in its width direction. For another example, when the distance L2 between one parking section line 102 (on the left side in FIG. 8) located in the parking allowable area 201 and the other vehicle 300 (the other vehicle 300 or an obstacle on the right side in FIG. 8) located on the other parking section line 102 located outside the parking allowable area 201 is smaller than the specified parking width, then the target position calculation unit 53 may not set the target parking position 200 and the parking assist apparatus 30 may stop the parking assist processing.

As illustrated in FIG. 8, when one of the pair of parking section lines 102 is located in the parking allowable area 201 while the other one of the parking section lines 102 is located outside the parking allowable area 201, the pair of parking section lines 102 being detected by the line detection unit 52, then the target position calculation unit 53 sets the target parking position 200 along the one of the pair of parking section lines 102. Furthermore, when the parking allowable area 201 is detected by the area detection unit 51 and at least one of the pair of parking section lines 102 provided on the track surface 101 is detected by the line detection unit 52, then the target position calculation unit 53 sets the target parking position 200 along the detected parking section line 102. Specifically, the target position calculation unit 53 sets the target parking position 200 in parallel with the detected parking section line 102.

Figure 9:
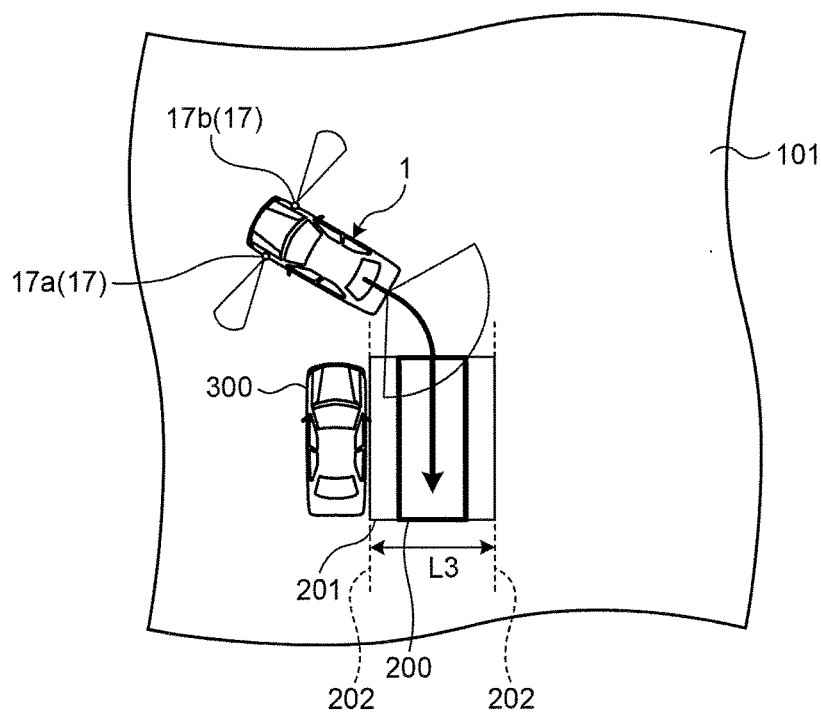
FIG. 9 is a schematic diagram illustrating still another example of the target parking position according to the embodiment.

As illustrated in FIG. 9, when the parking allowable area 201 is detected by the area detection unit 51 and the parking section lines 102 are not detected by the line detection unit 52, the target position calculation unit 53 calculates the target parking position 200 by using the detection result of the parking allowable area 201 by the area detection unit 51. FIG. 9 illustrates one example where the parking allowable area 201 is detected in the side direction of the other vehicle 300. In this case, the target position calculation unit 53 sets the target parking position 200 such that the center position of the parking allowable area 201 in a width L3 direction (the center position between the broken lines 202) coincides with the center of the target parking position 200 in its width direction.

When the area detection unit 51 fails to detect the parking allowable area 201 and the line detection unit 52 detects the parking section lines 102, the target position calculation unit 53 reflects the detection result of the parking section lines 102 by the line detection unit 52 into the setting of the target parking position 200. One example of such a situation is a case where no parked vehicles are present in the surrounding area of the vehicle 1 in a parking area where a large number of vehicles can be parked. In this case, the target position calculation unit 53 sets the target parking position 200 such that the center of the target parking position 200 is located at the medium of the pair of parking section lines 102.

The target position calculation unit 53 repeats calculation of the target parking position 200 in the backward traveling of the vehicle 1, and updates the target parking position 200, as one example. In the embodiment, the vehicle 1 repeats image recognition (detection of the parking section lines 102 by the line detection unit 52) by the imaging unit 16 while traveling backward (visual servo), and sets the target parking position 200.

Figure 10:
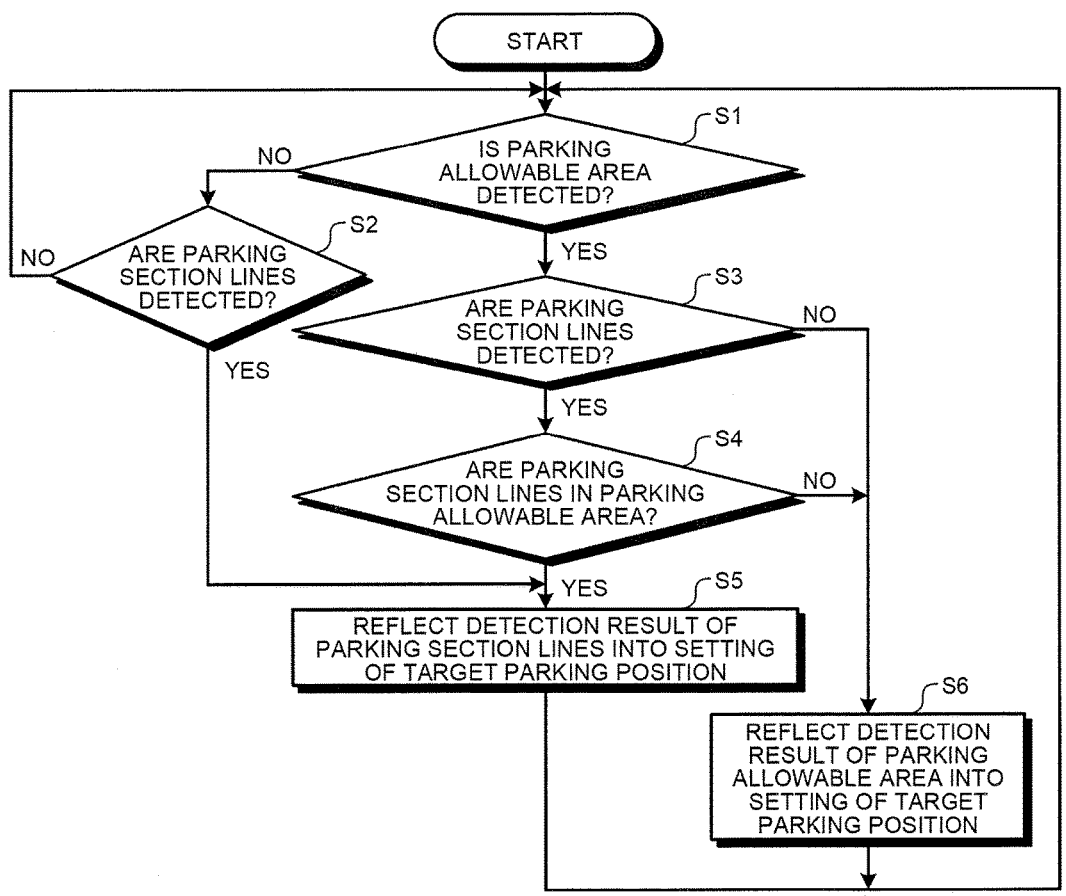
FIG. 10 is a flowchart illustrating one example of processing performed by a parking assist apparatus according to the embodiment.

The following describes an exemplary flow of the parking assist processing with reference to the flowchart illustrated in FIG. 10. This processing is performed when the movable section of the gear shift operation unit 7 is set to the reverse position, as described above, as one example.

If the area detection unit 51 detects the parking allowable area 201 (Yes at step S1) and the line detection unit 52 detects the parking section lines 102 (Yes at step S3), the target position calculation unit 53 determines whether the parking section lines 102 are in the parking allowable area 201 (step S4). If the target position calculation unit 53 determines that both of the pair of parking section lines 102 are in the parking allowable area 201 (Yes at step S4), the target position calculation unit 53 reflects the detection result of the parking section lines 102 by the line detection unit 52 into the setting of the target parking position 200 (step S5). One example of the target parking position 200 in this case is illustrated in FIG. 7. The detection of the parking allowable area 201 and the detection of the parking section lines 102 are performed at the stop or in backward traveling of the vehicle 1, as one example.

At step S4, if it is determined that at least one of the pair of parking section lines 102 is located outside the parking allowable area 201 (No at step S4), the target position calculation unit 53 reflects the detection result of the parking allowable area 201 by the area detection unit 51 into the setting of the target parking position 200 (step S6). In other words, at step S6, the position of the target parking position 200 is set on the basis of only the detection result of the parking allowable area 201 out of the detected parking section lines 102 and parking allowable area 201. One example of the target parking position in this case is illustrated in FIG. 8.

If the area detection unit 51 detects the parking allowable area 201 (Yes at step S1) and the line detection unit 52 fails to detect the parking section lines 102 (No at step S3), the target position calculation unit 53 reflects the detection result of the parking allowable area 201 by the area detection unit 51 into the setting of the target parking position 200 (step S6). One example of the target parking position in this case is illustrated in FIG. 9.

If the area detection unit 51 fails to detect the parking allowable area 201 (No at step S1) and the line detection unit 52 detects the parking section lines 102 (Yes at step S2), the target position calculation unit 53 reflects the detection result of the parking section lines 102 by the line detection unit 52 into the setting of the target parking position 200.

If the area detection unit 51 fails to detect the parking allowable area 201 (No at step S1) and the line detection unit 52 fails to detect the parking section lines 102 (No at step S2), step S1 and step S2 are repeated. The processing described above is repeated at certain intervals in backward traveling of the vehicle 1.

In the parking assist processing, the parking assist apparatus 30 (the parking assist ECU 14) may guide the vehicle 1 to the target parking position 200 by controlling the steering unit 4 (an automatic steering unit). The parking assist apparatus 30 (the parking assist ECU 14) may also cause the vehicle 1 to be automatically parked at the target parking position 200 by controlling the steering unit 4, the acceleration operation unit 5, the brake operation unit 6, the gear shift operation unit 7, and the like (an automatic parking unit). The parking assist apparatus 30 (the parking assist ECU 14) may cause the display device 8 to display the target parking position as parking assist information (an assist information display unit). In this case, the parking assist apparatus 30 (the parking assist ECU 14) may cause the display device 8 to display a relative positional relation among the target parking position, the parking section lines, and the obstacle.

As described above, in the embodiment, when the parking allowable area 201 is detected by the area detection unit 51, the parking section lines 102 are detected by the line detection unit 52, and the parking section line 102 is located outside the parking allowable area 201, then the target position calculation unit 53 calculates the target parking position 200 by using the detection result of the parking allowable area 201 by the area detection unit 51. According to the embodiment, when the parking allowable area 201 is detected by the area detection unit 51 and the parking section lines 102 are detected by the line detection unit 52, the target parking position 200 is calculated by using at least the detection result of the parking allowable area 201, thereby making it possible to prevent the target parking position 200 from being set excessively close to the other vehicle 300 unlike a case where the target parking position 200 is calculated by using only the detection result of the line detection unit 52.

In the embodiment, the line detection unit 52 detects the parking section lines 102 by using the data that is taken in backward traveling of the vehicle 1 and output from the imaging unit 16, which images an area behind the vehicle 1, and the target position calculation unit 53 repeats calculation of the target parking position 200 in backward traveling of the vehicle 1. According to the embodiment, the condition behind the vehicle can be sequentially detected as the vehicle 1 travels backward, as one example, thereby making it possible to sequentially change the target parking position in accordance with the detection result. For example, when the parking allowable area 201 is detected but the parking section lines 102 are not detected just after the start of the backward traveling of the vehicle 1, the target parking position 200 is calculated by using the detection result of the parking allowable area 201. Thereafter, when the pair of parking section lines 102 are detected as the vehicle 1 travels backward and the pair of parking section lines 102 are in the parking allowable area 201, the target parking position 200 is calculated by using the detection result of the pair of parking section lines 102. Then, as the vehicle 1 travels backward, when it is detected that the other one of the pair of parking section lines 102 is located outside the parking allowable area 201 because the other line is located under the other vehicle 300, as illustrated in FIG. 8, as one example, the target parking position 200 is calculated by using the parking allowable area 201, as one example.

In the embodiment, when the parking section line 102 is located outside the parking allowable area 201, the target position calculation unit 53 calculates the target parking position 200 by using the detection result of the parking allowable area 201 by the area detection unit 51, and the detection result of the parking section lines 102 by the line detection unit 52. As a result, the embodiment can prevent the target parking position 200 from being set excessively close to the other vehicle 300 by using the detection result of the parking allowable area 201 and the detection result of the parking section lines 102, as one example.

In the embodiment, when one of the pair of parking section lines 102 is located in the parking allowable area 201 while the other one of the pair of parking section lines 102 is located outside the parking allowable area 201, the target position calculation unit 53 sets the target parking position 200 closer to the one of the pair of parking section lines 102 between the pair of parking section lines 102. As a result, the embodiment can prevent the target parking position 200 from being set excessively close to the other vehicle 300 while the target parking position 200 is set between the pair of parking section lines 102, as one example.

In the embodiment, when the parking allowable area 201 is detected by the area detection unit 51 and at least one of the pair of parking section lines 102 provided on the track surface 101 is detected by the line detection unit 52, the target position calculation unit 53 sets the target parking position 200 along (in parallel with) the detected parking section line 102. As a result, the embodiment can prevent the target parking position 200 from being set on an angle with respect to the parking section line 102 even when the other one of the pair of parking section lines 102 is not detected, as one example.

The distance measuring units 17 may detect the other vehicle 300 and the like in the backward traveling to the target parking position 200 and may correct (update) the parking allowable area 201 detected in forward traveling as described with reference to FIG. 5, and thereafter the processing described above may be performed. Specifically, two distance measuring units are further provided on the vehicle body 2 in order to detect obstacles in the rear side direction of the vehicle 1 in addition to the distance measuring units 17a and 17b, as one example. The two distance measuring units are disposed close to the end portion 2e on the rear side (in the rear direction of the vehicle front-rear direction) of the vehicle body 2 and emit (radiate) ultrasonic waves (waves) toward right and left side directions of the vehicle in the same manner as the distance measuring units 17a and 17b. The two additionally provided distance measuring units detect the other vehicle 300 and the like in the backward traveling to the target parking position 200 as needed, and the parking assist processing illustrated in FIG. 10 and the like are performed while the parking allowable area 201 is corrected (updated) on the basis of the detection results. This configuration can appropriately identify the parking allowable area 201 the width of which becomes smaller toward the far side of the target parking position 200 even when the other vehicle 300 on the right side in FIG. 5 is obliquely parked in such manner that the front wheels are not located on the parking section line 102 but the rear wheels are located on the parking line 102, thereby making it possible to guide the vehicle 1 to a preferred target parking position 200.

The present invention is not limited to the embodiment described above. Other various embodiments and modifications can be adopted without departing from the spirit of the present invention.

EXPLANATIONS OF LETTERS OR NUMERALS 1 vehicle
16 imaging unit
17 distance measuring unit
30 parking assist apparatus
51 area detection unit
52 line detection unit
53 target position calculation unit
101 track surface
102 parking section line
200 target parking position
201 parking allowable area

The invention claimed is:

1. A parking assist apparatus comprising:
an area detection unit that detects a parking allowable area where parking of a vehicle is allowable;
a line detection unit that detects a pair of parking section lines provided on a track surface; and
a target position calculation unit that calculates a target parking position by using a detection result of the parking allowable area by the area detection unit and sets the target parking position closer to one of the pair of parking section lines when:
the parking allowable area is detected by the area detection unit,
the parking section lines are detected by the line detection unit, and
one of the pair of parking section lines is located outside the parking allowable area, and another one of the pair of parking section lines is located in the parking allowable area,
wherein an obstacle located in a rear side direction of the vehicle is detected in backward traveling, and the parking allowable area is corrected on basis of the detection result, and
the target position calculation unit calculates the target parking position by using the corrected parking allowable area and sets the target parking position closer to the one of the pair of parking section lines located in the parking allowable area.

2. The parking assist apparatus according to claim 1, wherein
the area detection unit detects the parking allowable area by using a detection result output from an emission unit that is provided on the vehicle, emits waves in a side direction of the vehicle, and detects reflections of the waves,
the line detection unit detects the parking section line by using data that is taken by an imaging unit in backward traveling of the vehicle and output from the imaging unit, the imaging unit being provided on the vehicle and imaging an area behind the vehicle, and
the target position calculation unit repeats calculation of the target parking position in the backward traveling of the vehicle.

3. A parking assist method comprising:
detecting a parking allowable area where parking of a vehicle is allowable with an area detection unit;
detecting a pair of parking section lines provided on a track surface with a line detection unit;

calculating a target parking position by using a detection result of the parking allowable area generated by the area detection unit, with a target position calculation unit, and setting the target parking position closer to one of the pair of parking section lines when:
- the parking allowable area is detected by the area detection unit,
- the parking section lines are detected by the line detection unit, and
- one of the pair of parking section lines is located outside the parking allowable area, and another one of the pair of parking section lines is located in the parking allowable area;

detecting an obstacle located in a rear side direction of the vehicle in backward traveling, and correcting the parking allowable area on basis of the detection result; and calculating the target parking position by using the corrected parking allowable area by the target position calculation unit, and setting the target parking position closer to the one of the pair of parking section lines located in the parking allowable area.

4. A computer program stored on a non-transitory computer readable medium including programmed instructions, wherein the instructions, when executed by a computer, cause the computer to perform:
- detecting a parking allowable area where parking of a vehicle is allowable;
- detecting a pair of parking section lines provided on a track surface;
- calculating a target parking position by using a detection result of the parking allowable area when:
  - the parking allowable area is detected,
  - the parking section lines are detected, and
  - one of the parking section lines is located outside the parking allowable area, and another one of the pair of parking section lines is located in the parking allowable area;
- detecting an obstacle located in a rear side direction of the vehicle in backward traveling, and correcting the parking allowable area on basis of the detection result; and
- calculating the target parking position by using the corrected parking allowable area and setting the target parking position closer to the one of the pair of parking section lines located in the parking allowable area.

5. The parking assist apparatus according to claim 1, wherein the target position calculation unit calculates the target parking position after detecting the parking allowable area in a side direction of the vehicle during forward traveling.

6. The parking assist method according to claim 3, wherein detecting a parking allowable area comprises detecting the parking allowable area in a side direction of the vehicle during forward traveling.

7. The computer program stored on a non-transitory computer readable medium according to claim 4, wherein detecting a parking allowable area comprises detecting the parking allowable area in a side direction of the vehicle during forward traveling.

\* \* \* \* \*